(12) United States Patent
Fisher et al.

(10) Patent No.: US 8,100,047 B2
(45) Date of Patent: Jan. 24, 2012

(54) SLIP SEAL DIAPHRAGM FOR SPRING BRAKE ACTUATOR

(75) Inventors: Albert D. Fisher, Kansas City, MO (US); Jess D. Thiel, Levant, KS (US)

(73) Assignee: Haldex Brake Corporation, Kansas City, MO (US)

( * ) Notice: Subject to any disclaimer, the term of this patent is extended or adjusted under 35 U.S.C. 154(b) by 658 days.

(21) Appl. No.: 12/254,220

(22) Filed: Oct. 20, 2008

(65) Prior Publication Data
US 2010/0095836 A1    Apr. 22, 2010

(51) Int. Cl.
*B60T 17/08* (2006.01)
*F01B 7/00* (2006.01)

(52) U.S. Cl. ............................................ 92/63
(58) Field of Classification Search .................. 92/63
See application file for complete search history.

(56) References Cited

U.S. PATENT DOCUMENTS

| | | | |
|---|---|---|---|
| 5,105,727 A * | 4/1992 | Bowyer ........................ | 92/63 |
| 5,725,076 A | 3/1998 | Pierce et al. | |
| 6,012,378 A * | 1/2000 | Hicks ........................... | 92/63 |
| 6,029,447 A | 2/2000 | Stojic et al. | |
| 6,164,187 A | 12/2000 | Stojic | |
| 6,394,462 B1 | 5/2002 | Constantinides et al. | |
| 6,626,083 B2 * | 9/2003 | Bowyer ........................ | 92/63 |
| 6,729,224 B1 * | 5/2004 | Roy ............................. | 92/63 |
| 7,121,191 B1 * | 10/2006 | Fisher ......................... | 92/63 |
| 2007/0013229 A1 | 1/2007 | Plantan et al. | |
| 2007/0034465 A1 | 2/2007 | Thompson et al. | |
| 2007/0131498 A1 * | 6/2007 | Li et al. ..................... | 188/166 |
| 2008/0083325 A1 | 4/2008 | Scheckelhoff et al. | |

OTHER PUBLICATIONS

Extended European Search Report; EP 09 17 3022; Jan. 8, 2010; 5 pages.

* cited by examiner

*Primary Examiner* — Thomas E Lazo
(74) *Attorney, Agent, or Firm* — St. Onge Steward Johnston & Reens LLC (57) ABSTRACT

A brake actuator system of a vehicle comprising a diaphragm design with a hole and sealing element in the center. The design allows for the sealing element to seal and slide on the outer diameter of the center pushrod for the exposed length. This eliminates the need for a fixed joint to permanently attach the diaphragm to the center pushrod, and allows for the pushrod to be attached to the spring piston or a separate fixed plate and reduces stress of the diaphragm at its interface.

42 Claims, 6 Drawing Sheets

SLIP SEAL DIAPHRAGM FOR SPRING BRAKE ACTUATOR

FIELD OF THE INVENTION

The invention relates to air-operated diaphragm brakes for vehicles, and more particularly to a service and spring brake actuator assembly that contains a slip seal spring brake diaphragm with a hole and sealing element in the center that allows the diaphragm to move the center rod without a return spring and does not require a fixed attachment to the spring piston, center rod or a separate attached plate. This also reduces the stress on the diaphragm caused by such a fixed attachment.

BACKGROUND OF THE INVENTION

Air brake systems for a vehicle such as a bus, truck, trailer and other heavy-duty vehicles or the like typically include a brake shoe and drum assembly which is actuated by means of an actuator assembly operated by the selective application of compressed air. Conventional air brake actuators have both a service brake actuator for actuating the brakes under normal driving conditions by the application of compressed air and a spring-type emergency brake actuator which causes actuation of the brakes when air pressure has been released. The emergency brake actuator includes a strong compression spring which forces application of the brake when air is released. This is often referred to as the spring brake.

Air-operated brake actuators are either piston type or diaphragm type. In the diaphragm type spring brake actuator, two air-operated diaphragm brake actuators are typically arranged in a tandem configuration, which includes an air-operated service brake actuator for applying the normal operating brakes of the vehicle, and a spring brake actuator for applying the parking or emergency brakes of the vehicle. Both the service brake actuator and the spring brake actuator include a housing having an elastomeric diaphragm dividing the interior of the housing into two distinct fluid chambers. On the other hand, the piston brake actuator operates under basically the same principles as above described, except that instead of a diaphragm, a piston with a sliding seal at the outside diameter reciprocates in a cylinder for applying the normal and/or parking brakes of the vehicles.

In a typical service brake actuator, the service brake section is divided into a pressure chamber and a pushrod chamber. The pressure chamber is fluidly connected to a source of pressurized air and the pushrod chamber mounts a pushrod, which is coupled to the brake assembly, whereby the introduction and exhaustion of pressurized air into the pressurized chamber reciprocates the pushrod into and out of the actuator to apply and release the operating brakes.

In a typical spring brake actuator, the spring brake section is divided into a pressure chamber and a spring chamber. A spring piston is positioned in the spring chamber between the diaphragm and a strong compression spring, whose opposing end abuts the housing. In one well-known configuration, an actuator rod extends from the spring piston, through the diaphragm, into the pressure chamber, and through a dividing wall separating the spring brake actuator from the service brake actuator. The end of the actuator is fluidly connected to the pressure chamber of the service brake actuator.

When applying the parking brakes, the spring brake actuator pressure is discharged from the pressure chamber and the large force compression spring pushes the spring piston and the diaphragm toward the dividing wall between the spring brake actuator and the service brake actuator. In this position, the actuator rod connected to the spring piston is pushed forward extending into the service section through the dividing center wall applying the parking or emergency brakes and thus forcing the vehicle to stop or remain parked. To release the parking brake, the pressure chamber is closed to the atmosphere and pressurized air is introduced into the pressure chamber of the spring brake actuator which expands the pressure chamber, moving the diaphragm and spring piston toward the opposing end of the spring brake actuator housing, thereby compressing the strong compression spring.

One known problem in association with spring brake actuators of this design is that as the large force compression spring is compressed, the pressure chamber increases in volume and the spring chamber decreases in volume, resulting in a pressure increase in the spring chamber unless it includes a particular system for relieving the pressure increase in the spring chamber. The build-up of pressure in the spring chamber upon the release of the brake is highly undesirable in that any pressure build-up in the spring chamber must be offset by an increased pressure in the pressure chamber in order to fully compress the spring and thus fully releasing the brake.

The pressure build-up in the spring chamber is exacerbated in that most pressurized air systems for heavy-duty vehicles operate at an industry standard maximum pressure. The combined force of the spring and the increase in air pressure in the spring chamber cannot approach the maximum for the brake to operate properly. As the combined force associated with the pressure of the spring and the build-up of pressure in the spring chamber approach the force applied by the maximum pressure, the brake can fail to release, only partially release, or release very slowly, all of which are undesirable.

Prior art designs have used a pushrod assembly such that when air pressure is applied to the diaphragm, the center pushrod is moved to the retracted position. One such design consists of a center pushrod and a separate attached plate on the opposite side of the spring section diaphragm from the spring piston. In this instance the center pushrod and separate plate are not attached to the spring piston and require the use of a return spring to assure the center pushrod is restrained in the brake release position when air pressure is applied to a flexible diaphragm forcing the parking spring to compress. Another similar existing design consists of a center pushrod and separate attached plate on the spring piston side of the diaphragm with the center rod projecting through the diaphragm. This design employs a fixed attachment of the diaphragm to the center rod and/or separate plate. This design does not require a return spring as the attached diaphragm will cause the center rod to move to the retracted position.

Another such design involves use of a solid attachment of the spring brake diaphragm to the center pushrod assembly and/or to the parking spring piston and center rod, so that when air pressure is applied to a flexible diaphragm, the parking spring is compressed. Both of the designs with a fixed attachment of the diaphragm and center rod, separate plate or spring piston, however, restrict the rotational and translational movement of the diaphragm with respect to the center pushrod. As a result of restricting translational and rotational movement, high stress is put upon the diaphragm at the attachment point of the diaphragm to the center pushrod. This is undesirable as increased stress on the diaphragm can cause it to malfunction or even crack.

It is desirable to develop a system that reduces stress at the diaphragm interface as this preserves the integrity of the diaphragm and provides longevity to the brake system. Furthermore, it is advantageous to eliminate the need for a center rod return spring in brake assemblies with center pushrod and fixed plates which are separate from the parking spring piston, as one of the embodiments of the present invention portrays.

SUMMARY OF THE INVENTION

The invention is directed to an air-operated service and spring brake actuator system comprising of a spring brake section diaphragm design which has a hole with a sealing element in the center. The design allows for an actuator pushrod to extend through the diaphragm, into the pressure chamber, and through a dividing wall separating the spring brake section from the service brake section. A sealing element seals and slides on the outer diameter of the center pushrod for the exposed length. This mechanism provides for reduced stress at the interface of the diaphragm and center pushrod due to the sliding feature.

In the present invention, the center pushrod can be either attached to a spring piston or a separate fixed pressure plate. This invention eliminates the need for a fixed joint to permanently attach the diaphragm to a separate fixed plate or the center pushrod, eliminating assembly complications and reducing stress in the diaphragm at the interface. The invention preserves the integrity of the diaphragm and provides longevity to the brake system.

According to one embodiment of the invention, an air-operated brake actuator for applying parking brakes of a vehicle comprises: a sealed housing including a first end wall, a second end wall opposing the first end wall, and a peripheral side wall extending between the first and second end walls, the first end wall, the second end wall and the peripheral side walls together defining an interior cavity therein; a diaphragm spanning the interior cavity, and dividing the cavity into a spring chamber located between the diaphragm and the first end wall, and a pressure chamber located between the diaphragm and the second end wall, the diaphragm being in a first position when the pressure chamber is pressurized with fluid and in a second position when the pressure chamber is exhausted; a pushrod, wherein when the diaphragm is in the second position the pushrod is positioned to apply the parking brake, and when the diaphragm is in the first position said pushrod is positioned to release the parking brake; and wherein said diaphragm has a hole though which said pushrod passes.

This concept allows the pushrod to be attached to a spring piston or a separate fixed plate. There is no need for a fixed joint to permanently attach the diaphragm to the pushrod component, preserving the integrity of the diaphragm and providing longevity to the brake system According to one embodiment, the slip seal diaphragm design contains a compressive seal element and a pressure activated lip seal element which are allowed to slide along the center pushrod, with the center pushrod permanently attached to the spring piston. When applying the parking brakes, the spring brake actuator pressure is discharged from the pressure chamber and the diaphragm is pushed toward the dividing wall between the spring brake actuator and the service brake actuator. This applies the parking or emergency brakes and thus forces the vehicle to stop or remain parked. The parking brake is released when the pressure chamber is closed and pressurized air is introduced, expanding the pressure chamber, and engaging the pressure activated lip seal element of the diaphragm against the actuator pushrod, causing the diaphragm and spring piston to move away from the dividing wall between the spring brake section and the service brake section. A reinforcing ring bonded to the rubber may be used if necessary to prevent distortion and assist the engagement of both the compressive seal element and lip seal element against the actuator pushrod.

According to another embodiment of the invention, the center pushrod is not attached to a spring piston, but rather is attached to a fixed plate on the rod which passes through the sliding central sealing elements in the spring section diaphragm. This advantage reduces stress upon the diaphragm by eliminating the fixed attachment point. This assembly design eliminates the need for a center pushrod return spring in brake assemblies with center pushrods and fixed plates which are separate from the parking spring piston. This design connects the center pushrod to a fixed plate. When the parking brake is released, air pressure is applied to the diaphragm causing it to compress the parking spring. This engages the pressure activated lip seal element and compressive seal around the center pushrod which is connected to the fixed plate. The center pushrod is moved to the retracted position and held by the diaphragm. This releases the parking or emergency brakes and thus allows the vehicle to move.

DETAILED DESCRIPTION OF THE INVENTION

Figure 1:
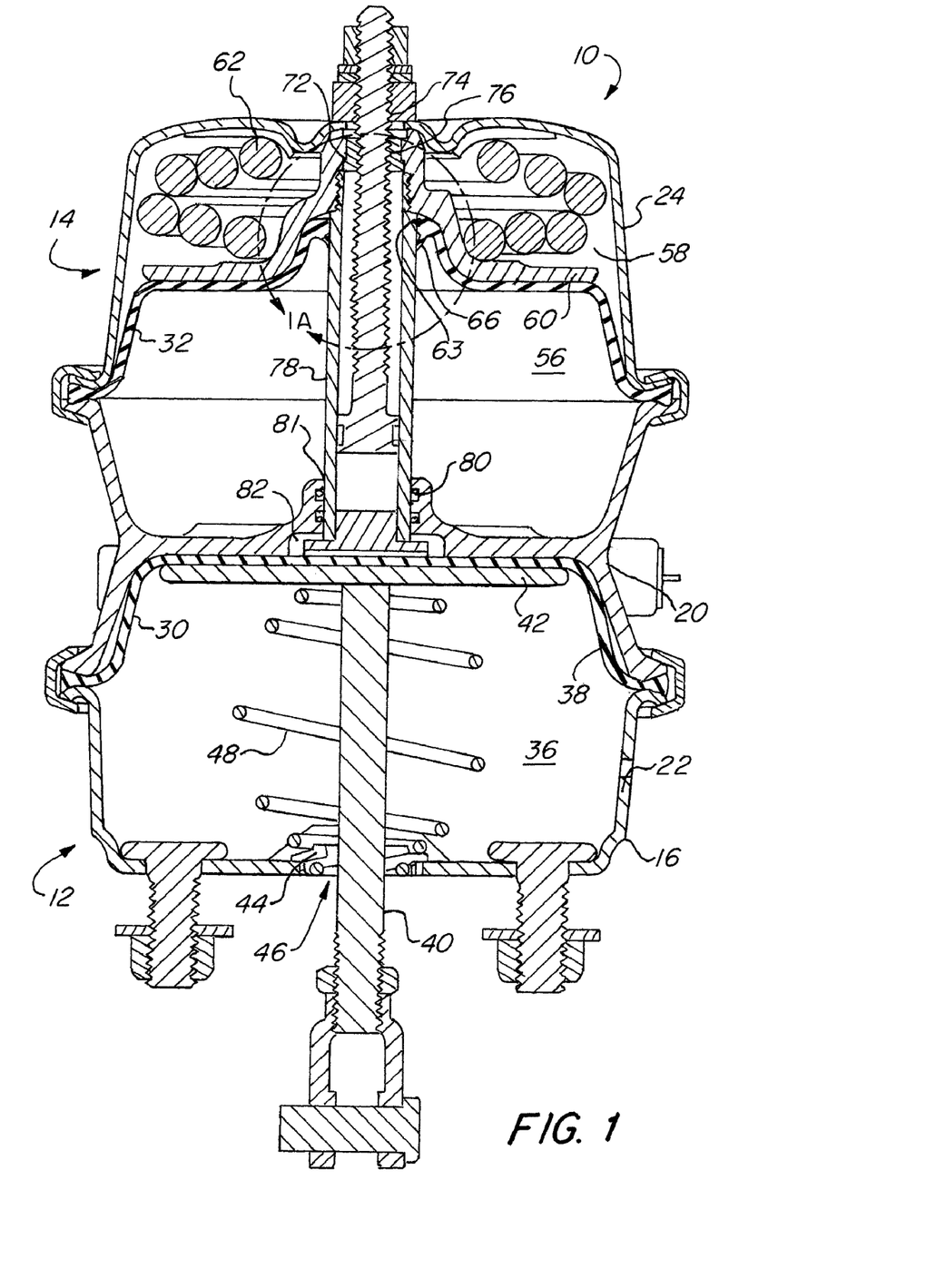
FIG. 1 illustrates a standard diaphragm design that has a hole with sealing element in the center for sealing and sliding on the outer diameter of the center pushrod for the exposed length, where the center pushrod is permanently attached to the spring piston. No compressive return spring is needed in this design.

FIG. 1 illustrates a tandem-type air-operated brake actuator 10 comprising a service brake section 12 in combination with a spring brake section 14. The service brake section 12 applies and releases the service or operating brakes of a vehicle. The spring brake section 14 is used to apply the emergency or parking brakes of the vehicle.

Both the service brake section 12 and the spring brake section 14 comprise a pressure chamber 38 and 56, which are formed by an adapter housing 20 to which are coupled a stud housing 22 and a spring housing 24, respectively. The adapter housing 20 defines a common dividing wall separating the service brake pressure chamber 38, from the spring brake pressure chamber 56 while forming a portion of each.

Movable members, which in this embodiment include elastomeric diaphragms 30, 32, span the interior of the service and spring pressure chamber 38 and 56, respectively, by having a peripheral edge of the diaphragm compressibly retained between the adapter housing 20 and the corresponding stud and spring housing 22, 24.

Looking specifically at the service brake section 12, the diaphragm 30 fluidly divides the service brake section 12 into a non-pressure pushrod cavity 36 and a pressure chamber 38. A pushrod 40, having a piston plate 42 disposed at one end, is provided within the pushrod cavity 36, with the piston plate 42 abutting the diaphragm 30 and the pushrod 40 extending through an opening 46 in the stud housing 22. A return spring 48 is disposed between the bearing 44 and the piston plate 42 to aid in biasing the piston plate 42 along with the pushrod 40 into the interior of the pressure chamber 38. Although not shown, the end of the pushrod 40 is mated to additional brake system components whereby the reciprocation of the pushrod 40 relative to the service brake housing 16 results in the application and release of the service brakes.

The pressure chamber 38 is fluidly connected to a source of pressurized air through an inlet port 50 (not shown). As the operator of the vehicle applies the brake pedal, pressurized air is introduced or exhausted from the pressure chamber 38 through the inlet port 50 to reciprocate the pushrod 40. The addition of pressurized air into the pressure chamber 38 urges the piston plate 42 and pushrod 40 from the adapter housing 20 toward the stud housing 22 to apply the service brakes.

Looking more closely at the spring brake section 14, the diaphragm 32 fluidly divides the spring brake housing 24 into a pressure chamber 56 and non-pressurized spring cavity 58. The pressure chamber 56 is fluidly connected to a source of pressurized air through a port that is not shown in the drawings, but is substantially identical to port 50. Typically, the pressure chamber 56 is supplied by a pressurized air system that is physically distinct from the pressurized air system supplying the service brake section 12.

A spring piston 60 is provided in the spring cavity 58, with a large force compression spring 62 disposed between the spring piston 60 and the spring brake housing 24. The spring piston 60 attaches to a pushrod tube 78. Diaphragm 32 has a compressive seal element 63 and a pressure activated seal element 66 in annular contact with the outer diameter of pushrod tube 78. This is shown more clearly in FIG. 1A.

The spring piston 60 further includes an axial stepped opening 68 in which are defined a bearing shoulder 72, for instance. The axial opening 68 is aligned with an opening 74 in the spring brake cover 24.

An annular bearing or flange guide 76 is mounted within the axial opening 68 and located by contacting the bearing shoulder 72. A center pushrod 78 has one end threaded into the axial opening 68 and abutting a flange portion of the annular bearing 76. The connection structure of the diaphragm 32 and the center pushrod 78 to the spring piston 60 can differ from the above illustrated one depending upon particular design of the spring brake section 14. The annular bearing 76 and the spring piston 60 define therein air passageways or clearances (not shown) to allow air flow that air can flow back and forth between the spring cavity 58 and the pressure chamber 38, by means of a hollow center pushrod 78.

The other end of the center pushrod 78 extends through a bearing and seal assembly 80 disposed within an opening 81 formed in the adapter housing 20. The bearing and seal assembly 80 are well known. The transfer plate 82 regulates air flow between the spring cavity 58 and pressure chamber 38.

Figure 1A:
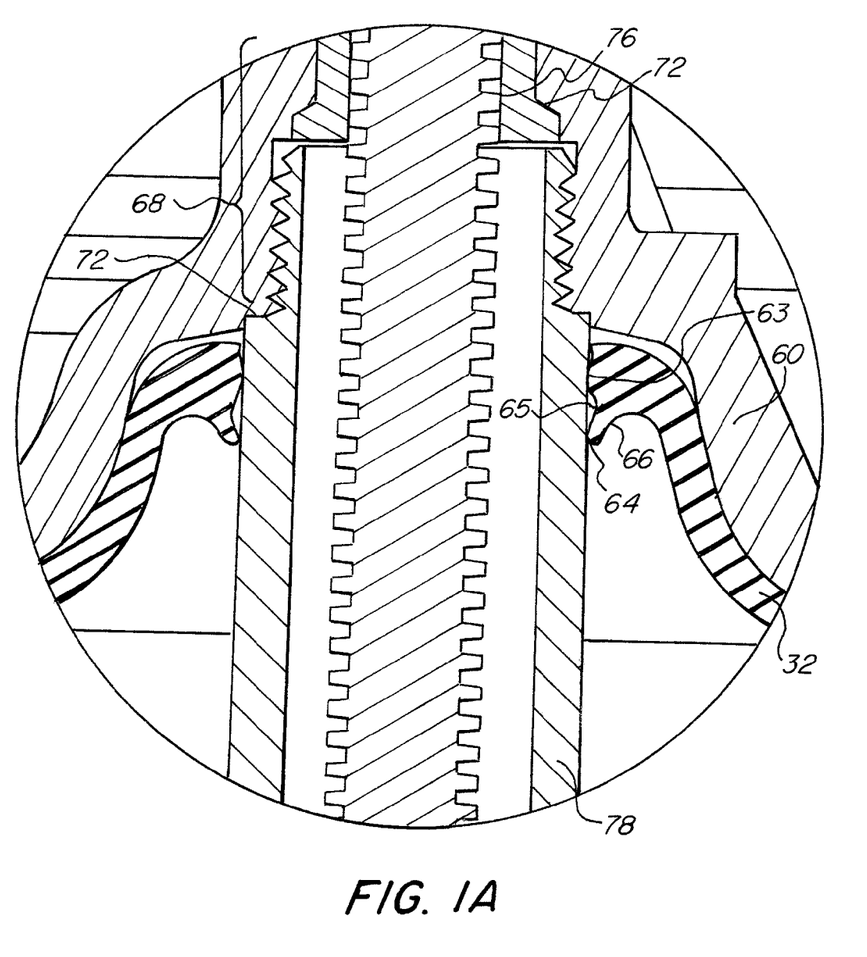
FIG. 1A illustrates a detailed view of the sealing design of the spring brake diaphragm design of FIG. 1.

Referring now to FIG. 1A, the sealing element is described in greater detail. A hole 65 is formed by two sealing elements, a pressure activated lip seal element 66 and a compressive seal element 63 forming the center of the hole. Both sealing elements are designed to seal and slide on the outer diameter of the center pushrod 78 for its exposed length. This allows the center pushrod 78 to be attached to the spring piston 60. This eliminates the need for a fixed joint to permanently attach the diaphragm 32 to the spring piston 60, thereby eliminating assembly complications and reducing stress in the diaphragm 32 at the interface. Further, a reinforcing ring 70 (not shown) bonded to the diaphragm 32 may be used, if necessary to provide, stability to the sealing element.

Operating conditions of the spring brake actuators and compressive seal element 63 are described hereafter. The elastic diaphragm 32 naturally compresses against the side wall of the center pushrod so that it seals the opening for preventing free flow of air there through and thus between the spring cavity 58 and the pressure chamber 56.

When the parking brakes are released, pressurized air enters the pressure chamber 56 of the spring brake section 14. As the volume of the pressure chamber 56 increases, the volume of the spring cavity 58 decreases, thus increasing the pressure of the air contained therein. The pressurized air in the spring cavity 58 is fluidly connected to the transfer plate 82 through the axial opening 68 of the spring piston 60 and through the inner cavity of the center pushrod 78.

When the parking brake is applied by exhausting the pressurized air from the pressure chamber 56 of the spring brake actuator, the compression spring 62 pushes the spring piston 60 and the diaphragm 32 toward the dividing wall between the spring brake section 14 and the service brake section 12. As a result, the center pushrod 78 connected to the spring piston 60 is pushed forward applying the parking or emergency brakes and thus forcing the vehicle stop or remain parked in a manner as described above and well known in the art. However, during the expanding process of the spring cavity 58, a vacuum or low pressure is created by the forced movement of the diaphragm 32, which can delay the application time of the spring brakes or be otherwise harmful to proper operation of the spring brakes. The transfer plate 82 allows for some air flow to fill the expanding volume of the spring cavity 58 as when the spring brake is being applied.

One advantage of the present invention is that the spring brake section 14 is completely sealed with respect to the atmosphere. The pressurized sealing element also limits the need for a fixed joint to permanently attach the diaphragm 32 to the center pushrod 78, thereby eliminating assembly complications and reducing stress in the diaphragm 32 at the interface.

Figure 2:
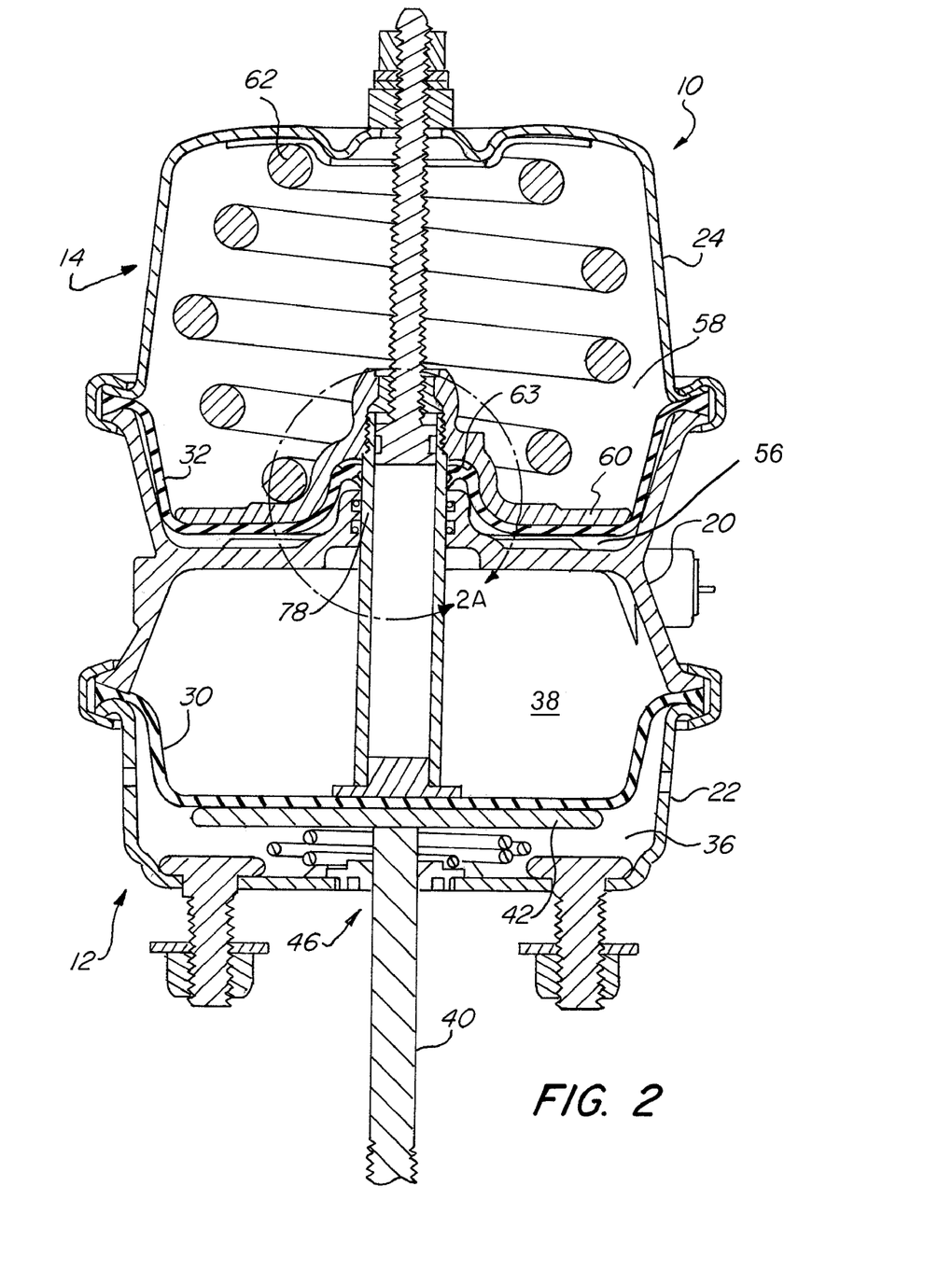
FIG. 2 shows an inverted diaphragm design with the slip seal, where the center pushrod tube is permanently attached to the spring piston. No compressive return spring is needed in this design.

In another embodiment of the invention, an inverted diaphragm design is shown as in FIG. 2, where there is no need for a center pushrod return spring, not shown.

Figure 2A:
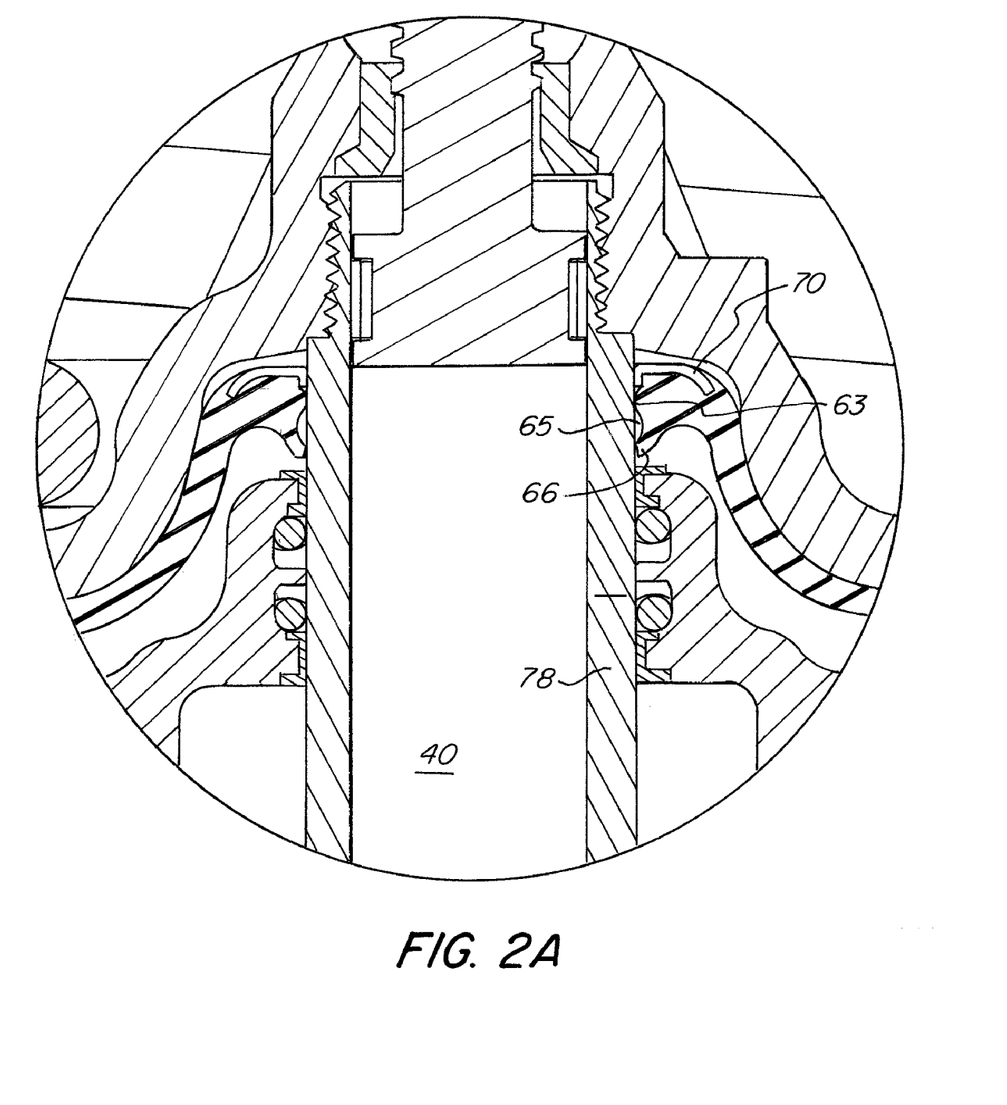
FIG. 2A is detailed view of a the sealing design of the inverted spring brake diaphragm design of FIG. 2.

As shown in FIGS. 2 and 2A, the compressive seal element 63 makes annular contact with center pushrod 78. A hole 65 is formed with pressure activated lip seal element 66 and compressive seal element 63 forming the center of the hole. Both sealing elements are designed to seal and slide on the outer diameter of the center pushrod 78 for its exposed length. This allows the center pushrod 78 to be attached to the spring piston 60. This eliminates the need for a fixed joint to permanently attach the diaphragm 32 to the center pushrod 78, thereby eliminating assembly complications and reducing stress in the diaphragm 32 at the interface. Further, a reinforcing ring 70 bonded to the diaphragm 32 may be used, if necessary, to provide stability to the sealing elements, as no rod return spring, not shown, is present in the embodiment.

Figure 3:
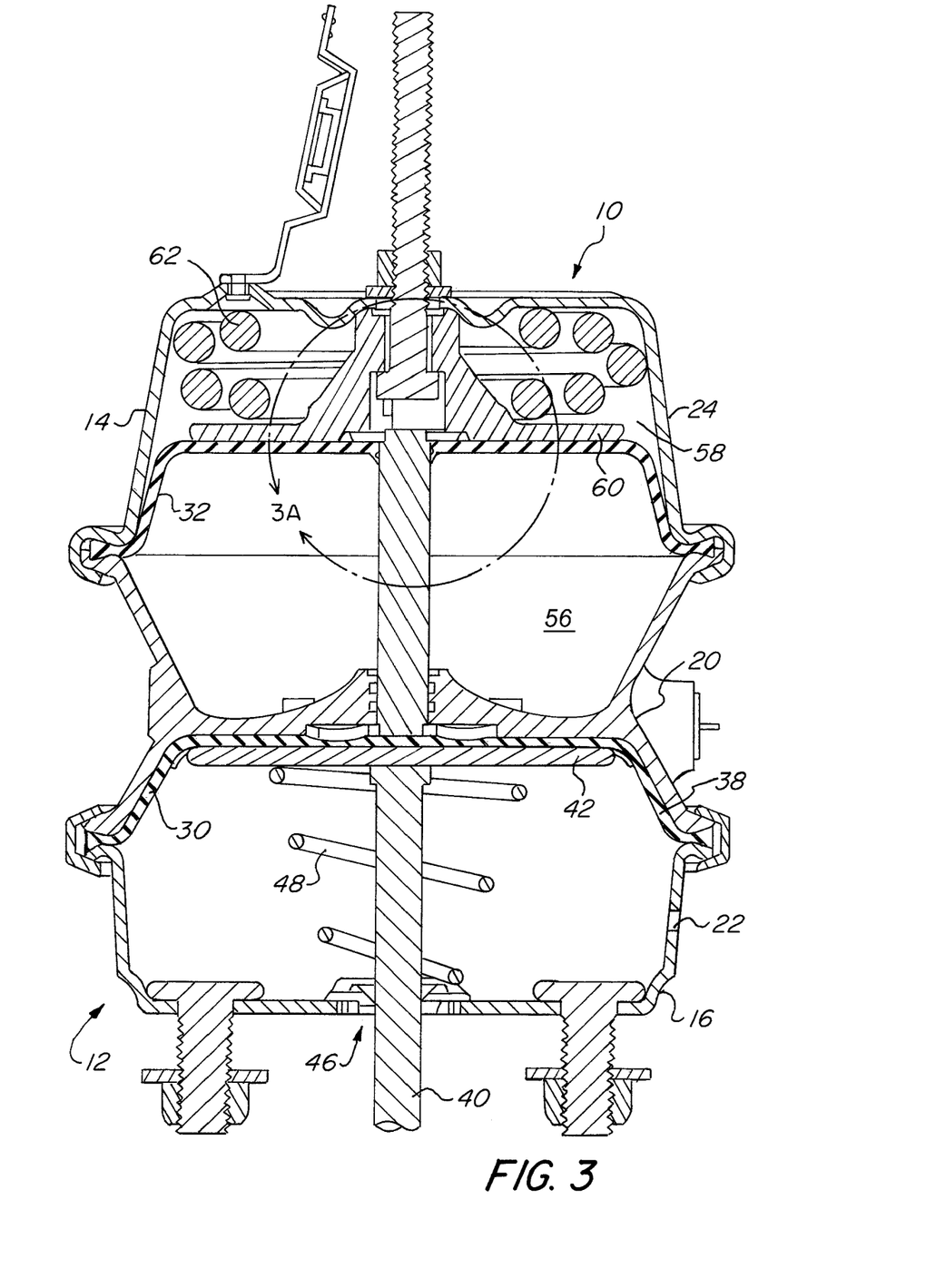
FIG. 3 illustrates an embodiment of the present invention with a diaphragm design that reduces stress on the diaphragm during park brake application, where the center pushrod is not attached to the spring piston. No compressive return spring is needed in this design.
Figure 3A:
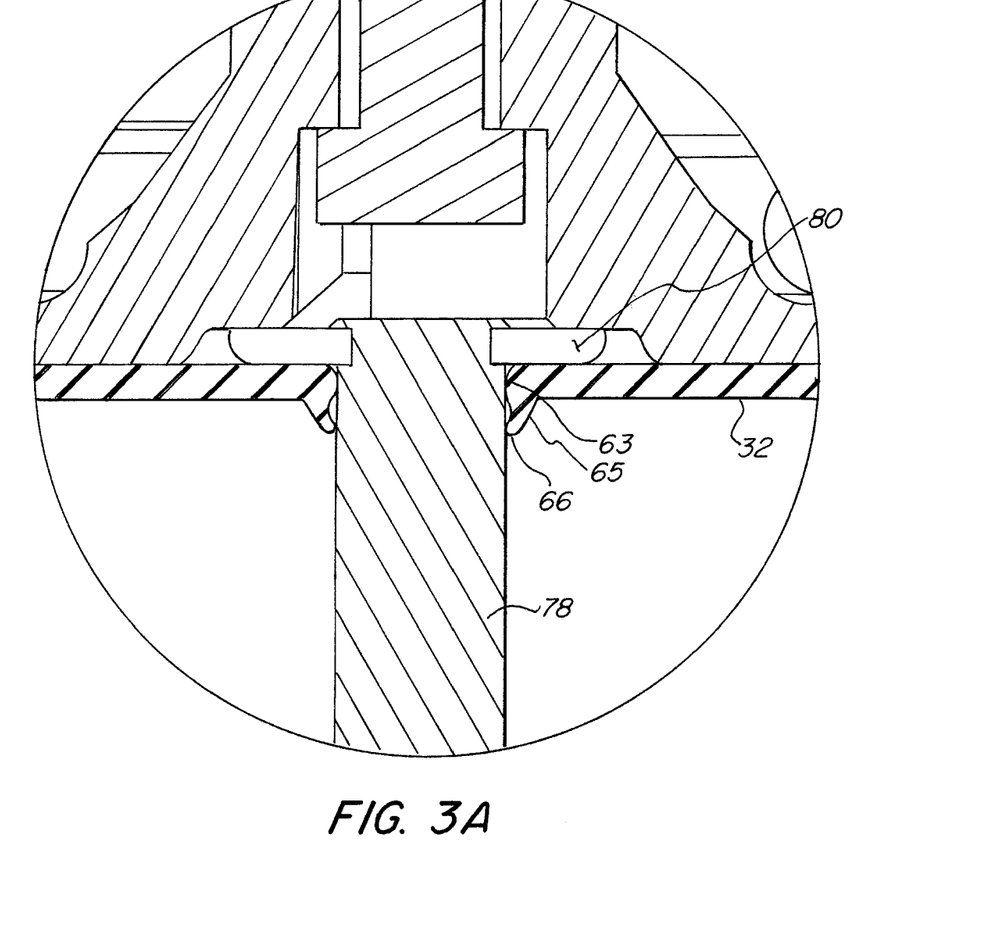
FIG. 3A is a detailed view of the sealing elements on the spring brake diaphragm design of FIG. 3.

FIG. 3 portrays another embodiment of the invention whereby the center pushrod 78 is not attached to a spring piston 60, yet is attached to a fixed plate 80. As shown in FIGS. 3 and 3A, a hole 65 is formed with pressure activated lip seal element 66 and compressive seal element 63 forming the center of the hole. Both sealing elements are designed to seal and slide on the outer diameter of the center pushrod 78 for its exposed length. This eliminates the need for a fixed joint to permanently attach the diaphragm 32 to the center pushrod 78 and fixed plate 80 thereby eliminating assembly complications and reducing stress in the diaphragm 32 at the interface. Further, a reinforcing ring 70 (not shown) bonded to the diaphragm 32 may be used, if necessary to provide, stability to the sealing element.

While the invention has been specifically described in connection with certain specific embodiments thereof, it is to be understood that this is by way of illustration and not of limitation and that various changes and modifications in form and details can be made thereto, and the scope of the appended claims should be construed as broadly as the prior art will permit.

What is claimed is:

1. An air-operated spring brake actuator for applying parking brakes of a vehicle comprising:
    a housing including a first end wall, a second end wall opposing the first end wall, and a side wall extending between the first and second end walls, the first end wall, the second end wall and the side walls together defining an cavity therein;
    a diaphragm spanning the cavity, and dividing the cavity into a spring chamber located between the diaphragm and the first end wall, and a pressure chamber located between the diaphragm and the second end wall, the diaphragm being in a first position when the pressure chamber is pressurized with fluid and in a second position when the pressure chamber is exhausted; and
    a pushrod, wherein when the diaphragm is in the second position the pushrod is positioned to apply the parking brake, and when the diaphragm is in the first position said pushrod is positioned to release the parking brake;
    one or more sealing elements;
    wherein said diaphragm has a hole though which said pushrod passes, and wherein said one or more sealing elements seal the pushrod to the diaphragm.

2. The brake actuator of claim 1, further comprising a supporting ring.

3. The brake actuator of claim 2, wherein the supporting ring is formed of material more rigid than a material used to form said diaphragm.

4. The brake actuator of claim 2, wherein the supporting ring is located on said diaphragm in a position nearer to the spring chamber than to the pressure chamber.

5. The brake actuator of claim 2, wherein said brake actuator further comprises a push plate located between the first end wall and said diaphragm, and wherein the push plate transmits force from the spring chamber to said diaphragm.

6. The brake actuator of claim 5, wherein the push plate transmits force from the push plate to said pushrod.

7. The brake actuator of claim 1, wherein the one or more sealing elements are made of a material that resists expansion due to temperature increase.

8. The brake actuator of claim 1, wherein said pushrod is not permanently attached to a spring.

9. The brake actuator of claim 1, wherein a spring is disposed in the spring chamber and biases the diaphragm toward the second position.

10. The brake actuator of claim 1, wherein the one or more sealing elements are activated by air pressure.

11. The brake actuator of claim 1, wherein the translational and rotational movement of the diaphragm is not restricted.

12. The brake actuator of claim 1, wherein said diaphragm is not permanently attached to said pushrod.

13. The brake actuator of claim 1, wherein the one or more sealing elements slide along the pushrod.

14. The brake actuator of claim 1, wherein the one or more sealing elements include a pressure activated lip seal element and a compressive seal element.

15. The brake actuator of claim 14, wherein the compressive seal element makes annular contact with the pushrod.

16. An air-operated spring brake actuator for applying parking brakes of a vehicle comprising:
    a housing including a first end wall, a second end wall opposing the first end wall, and a side wall extending between the first and second end walls, the first end wall, the second end wall and the side walls together defining an cavity therein;
    a diaphragm spanning the cavity, and dividing the cavity into a spring chamber located between the diaphragm and the first end wall, and a pressure chamber located between the diaphragm and the second end wall, the diaphragm being in a first position when the pressure chamber is pressurized with fluid and in a second position when the pressure chamber is exhausted;
    a pushrod, wherein when the diaphragm is in the second position the pushrod is positioned to apply the parking brake, and when the diaphragm is in the first position said pushrod is positioned to release the parking brake; and
    wherein said diaphragm has a hole though which said pushrod passes, wherein said diaphragm has an edge for sealing against a surface of said pushrod.

17. The brake actuator of claim 16, further comprising a supporting ring.

18. The brake actuator of claim 17, wherein the supporting ring is formed of material more rigid than a material used to form said diaphragm.

19. The brake actuator of claim 17, wherein the supporting ring is located on said diaphragm in a position nearer to the spring chamber than to the pressure chamber.

20. The brake actuator of claim 17, wherein said brake actuator further comprises a push plate located between the first end wall and said diaphragm, and wherein the push plate transmits force from the spring chamber to said diaphragm.

21. The brake actuator of claim 20, wherein the push plate transmits force from the push plate to said pushrod.

22. The brake actuator of claim 16, wherein one or more sealing elements are made of a material that resists expansion due to temperature increase.

23. A seal for use in an air-operated brake actuator system of a vehicle, the brake actuator system comprising:
    a spring brake actuator and a service brake actuator arranged in tandem, whereby spring brake actuator includes a brake diaphragm with spring chamber and a pressure chamber, and a pushrod disposed in the spring brake actuator and axially movable towards the service brake actuator for applying a parking brake, wherein said service brake actuator includes a service pressure chamber for applying a service brake,
    wherein the seal is located on the outer diameter of the pushrod, whereby upon pressure applied to the diaphragm, the seal seals the pushrod and moves it into a retracted position held by the diaphragm.

24. The seal of claim 23, wherein the sealing element that attaches the diaphragm to the center pushrod is not permanently attached to the diaphragm.

25. The seal of claim 23, wherein the sealing element contains a reinforcing ring.

26. The seal of claim 23, wherein translational and rotational movement of the diaphragm is not restricted.

27. An air-operated spring brake actuator for applying parking brakes of a vehicle comprising:
- a housing including a first end wall, a second end wall opposing the first end wall, and a side wall extending between the first and second end walls, the first end wall, the second end wall and the side walls together defining an cavity therein;
- a diaphragm spanning the cavity, and dividing the cavity into a spring chamber located between the diaphragm and the first end wall, and a pressure chamber located between the diaphragm and the second end wall, the diaphragm being in a first position when the pressure chamber is pressurized with fluid and in a second position when the pressure chamber is exhausted; and
- a pushrod,
- wherein when the diaphragm is in the second position the pushrod is positioned to apply the parking brake, and when the diaphragm is in the first position said pushrod is positioned to release the parking brake, and
- wherein said diaphragm has a hole though which said pushrod passes, wherein the hole includes an edge for sealing against a surface of said pushrod, and wherein the sealing edge of the hole includes a tapered portion.

28. The brake actuator of claim 27, wherein the tapered portion has an outer thickness which is greater than a thickness of said diaphragm and an inner thickness that is equal to thickness of said diaphragm.

29. The brake actuator of claim 28, wherein the tapered portion has a supporting ring.

30. The brake actuator of claim 29, wherein the supporting ring is formed of material more rigid than a material used to form said diaphragm.

31. The brake actuator of claim 30, wherein said supporting ring is located on said diaphragm in a position nearer to the spring chamber than to the pressure chamber.

32. The brake actuator of claim 30, wherein said brake actuator further comprises a push plate located between the first end wall and said diaphragm, and wherein the said push plate transmits force from the spring chamber to said diaphragm.

33. An air-operated spring brake actuator for applying parking brakes of a vehicle comprising:
- a housing including a first end wall, a second end wall opposing the first end wall, and a side wall extending between the first and second end walls, the first end wall, the second end wall and the side walls together defining an cavity therein;
- a diaphragm spanning the cavity, and dividing the cavity into a spring chamber located between the diaphragm and the first end wall, and a pressure chamber located between the diaphragm and the second end wall, the diaphragm being in a first position when the pressure chamber is pressurized with fluid and in a second position when the pressure chamber is exhausted; and
- a pushrod,
- wherein when the diaphragm is in the second position the pushrod is positioned to apply the parking brake, and when the diaphragm is in the first position said pushrod is positioned to release the parking brake, and
- wherein said diaphragm has a hole though which said pushrod passes, wherein the hole includes an edge for sealing against a surface of said pushrod, and wherein the hole includes greater than one edge for sealing against a surface of said pushrod.

34. The brake actuator of claim 33, wherein at least one sealing edge of the hole includes a reinforced portion.

35. The brake actuator of claim 34, wherein the reinforced portion of at least one sealing edge has a thickness which is greater than a thickness of said diaphragm.

36. The brake actuator of claim 35, wherein the reinforced portion of at least one sealing edge has a supporting ring.

37. The brake actuator of claim 36, wherein the supporting ring is formed of material more rigid than a material used to form said diaphragm.

38. The brake actuator of claim 36, wherein the supporting ring is located on said diaphragm in a position nearer to the spring chamber than to the pressure chamber.

39. The brake actuator of claim 36, wherein said brake actuator further comprises a push plate located between the first end wall and said diaphragm, and wherein the push plate transmits force from the spring chamber to said diaphragm.

40. An air-operated spring brake actuator for applying parking brakes of a vehicle comprising:
- a housing including a first end wall, a second end wall opposing the first end wall, and a side wall extending between the first and second end walls, the first end wall, the second end wall and the side walls together defining an cavity therein;
- a diaphragm spanning the cavity, and dividing the cavity into a spring chamber located between the diaphragm and the first end wall, and a pressure chamber located between the diaphragm and the second end wall, the diaphragm being in a first position when the pressure chamber is pressurized with fluid and in a second position when the pressure chamber is exhausted; and
- a pushrod,
- wherein when the diaphragm is in the second position the pushrod is positioned to apply the parking brake, and when the diaphragm is in the first position said pushrod is positioned to release the parking brake,
- wherein said diaphragm has a hole though which said pushrod passes,
- wherein the hole includes an edge for sealing against a surface of said pushrod,
- wherein the sealing edge of the hole includes a reinforced portion,
- wherein the reinforced portion of the sealing edge has a thickness which is greater than a thickness of said diaphragm,
- wherein the reinforced portion of the sealing edge has a supporting ring, and
- wherein the supporting ring is located on said diaphragm in a position nearer to the spring chamber than to the pressure chamber.

41. An air-operated spring brake actuator for applying parking brakes of a vehicle comprising:
- a housing including a first end wall, a second end wall opposing the first end wall, and a side wall extending between the first and second end walls, the first end wall, the second end wall and the side walls together defining an cavity therein;
- a diaphragm spanning the cavity, and dividing the cavity into a spring chamber located between the diaphragm and the first end wall, and a pressure chamber located between the diaphragm and the second end wall, the diaphragm being in a first position when the pressure chamber is pressurized with fluid and in a second position when the pressure chamber is exhausted;
- a pushrod, wherein when the diaphragm is in the second position the pushrod is positioned to apply the parking brake, and when the diaphragm is in the first position said pushrod is positioned to release the parking brake; and wherein said diaphragm has a hole though which said pushrod passes, wherein the hole includes an edge for sealing against a surface of a tube that surrounds said pushrod, wherein the sealing edge of the hole includes a reinforced portion, wherein the reinforced portion of the sealing edge has a thickness which is greater than a thickness of said diaphragm, wherein the reinforced portion of the sealing edge has a supporting ring, and wherein the supporting ring is located on said diaphragm in a position nearer to the spring chamber than to the pressure chamber.

42. A seal for use in an air-operated brake actuator system of a vehicle, the brake actuator system comprising:

a spring brake actuator and a service brake actuator arranged in tandem, whereby spring brake actuator includes a brake diaphragm with spring chamber and a pressure chamber, and a pushrod disposed in the spring brake actuator and axially movable towards the service brake actuator for applying a parking brake, wherein said service brake actuator includes a service pressure chamber for applying a service brake, wherein the seal is located on the outer diameter of the pushrod, whereby upon pressure applied to the diaphragm, the seal seals the pushrod and moves it into a retracted position held by the diaphragm, and wherein the seal contains a compressive seal lip.

* * * * *